United States Patent
Suzuki et al.

(10) Patent No.: US 12,548,124 B2
(45) Date of Patent: Feb. 10, 2026

(54) MAGNETIC RESONANCE IMAGING APPARATUS, IMAGE PROCESSOR, AND IMAGE NOISE REDUCTION METHOD

(71) Applicant: FUJIFILM Healthcare Corporation, Kashiwa (JP)

(72) Inventors: Atsuro Suzuki, Chiba (JP); Tomoki Amemiya, Chiba (JP); Yukio Kaneko, Chiba (JP); Toru Shirai, Chiba (JP); Keisuke Nishio, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 346 days.

(21) Appl. No.: 18/112,498

(22) Filed: Feb. 21, 2023

(65) Prior Publication Data
US 2023/0281760 A1 Sep. 7, 2023

(30) Foreign Application Priority Data

Mar. 7, 2022 (JP) ................... 2022-034774

(51) Int. Cl.
*G06K 9/00* (2022.01)
*A61B 5/055* (2006.01)
(Continued)

(52) U.S. Cl.
CPC ............... *G06T 5/70* (2024.01); *A61B 5/055* (2013.01); *G06T 7/11* (2017.01); *G06T 2207/10088* (2013.01); *G06T 2207/20084* (2013.01)

(58) Field of Classification Search
CPC ............. G06T 5/70; G06T 2207/10088; G06T 2207/20084; G06V 10/30; G06V 10/82
See application file for complete search history.

(56) References Cited

U.S. PATENT DOCUMENTS

| | | | |
|---|---|---|---|
| 10,635,943 B1 * | 4/2020 | Lebel | ........................ G06T 5/50 |
| 2009/0074279 A1 | 3/2009 | Razifar et al. | |

(Continued)

FOREIGN PATENT DOCUMENTS

| | | |
|---|---|---|
| CN | 113344951 A | 9/2021 |
| CN | 113558600 A | 10/2021 |

(Continued)

OTHER PUBLICATIONS

Zhang, Kai, Wangmeng Zuo, and Lei Zhang. "FFDNet: Toward a fast and flexible solution for CNN-based image denoising." IEEE Transactions on Image Processing 27.9 (2018): 4608-4622. (Year: 2018).*

(Continued)

*Primary Examiner* — Hadi Akhavannik
(74) *Attorney, Agent, or Firm* — Paul Teng

(57) ABSTRACT

In an image noise reduction process using a CNN, noise can be reduced effectively irrespective of signal levels and noise levels of the image. Noise information and signal level information are calculated from an image inputted in the CNN. Using the calculated information, a normalization factor suitable for the CNN is determined, and normalization of the input image is performed. The noise information is estimated from magnitude of background noise of the input image in the case where the input image is an MRI image. The signal information can be calculated, for example, as a mean value of pixel values of a subject region with respect to an image obtained by dividing the input image by the magnitude of the background noise.

18 Claims, 17 Drawing Sheets

(51) Int. Cl.
    *G06T 5/70*    (2024.01)
    *G06T 7/11*    (2017.01)

(56) References Cited

U.S. PATENT DOCUMENTS

| | | | |
|---|---|---|---|
| 2010/0183217 | A1 | 7/2010 | Seung et al. |
| 2018/0144465 | A1* | 5/2018 | Hsieh .................... G06N 3/04 |
| 2018/0349759 | A1 | 12/2018 | Isogawa et al. |
| 2018/0357753 | A1* | 12/2018 | Lehtinen ................ G06N 3/045 |
| 2019/0347772 | A1* | 11/2019 | Zhang .................... G06T 5/60 |
| 2020/0034948 | A1 | 1/2020 | Park et al. |
| 2021/0333347 | A1 | 10/2021 | Shoji et al. |
| 2021/0383510 | A1* | 12/2021 | Sharma .................. G06T 5/70 |

FOREIGN PATENT DOCUMENTS

| | | | |
|---|---|---|---|
| EP | 3410392 | A1 | 12/2018 |
| JP | H11-031214 | A | 2/1999 |
| JP | 2018-206382 | A | 12/2018 |
| JP | 2021-086284 | A | 6/2021 |
| WO | WO2020/166005 | A1 | 8/2020 |

OTHER PUBLICATIONS

EPO official action dated Feb. 25, 2025 in connection with European Patent Application No. 23 159 376.
Japanese official action dated Jan. 7, 2025 in connection with Japanese Patent Application No. 2022-034774.
European search report dated Jul. 11, 2023 in connection with European Patent Application No. 23 15 9376.
Manjon Jose V. et al., "MRI denoting using Deep Learning and Non-local averaging", arkiv.org, Cornell University Library (Nov. 12, 2019) XP081530784.
Tian Qiyuan et al., "SDnDTI: Self-supervised deep learning-based denoising for diffusion tensor MRI", J. Neuroimage, vol. 253, 119033 (Mar. 1, 2022) XP087022574.
Zhang Yushu et al., "A Patch Based Denoising Method Using Deep Convolutional Neural Network for Seismic Image", IEEE Access, vol. 7 (Oct. 28, 2019) pp. 156883-156894, XP011756577.
Atsuro Suzuki et al., "Deep-learning-based noise reduction incorporating inhomogeneous spatial distribution of noise in parallel MRI imaging", Proc 2021 ISMRM & SMRT Annual Mtg & Exh, No. 3264 (Apr. 30, 2021) XP040725283.
Chinese official action (and English translation thereof) dated Oct. 28, 2025 in connection with counterpart Chinese Patent Application No. 2022111545529.

\* cited by examiner

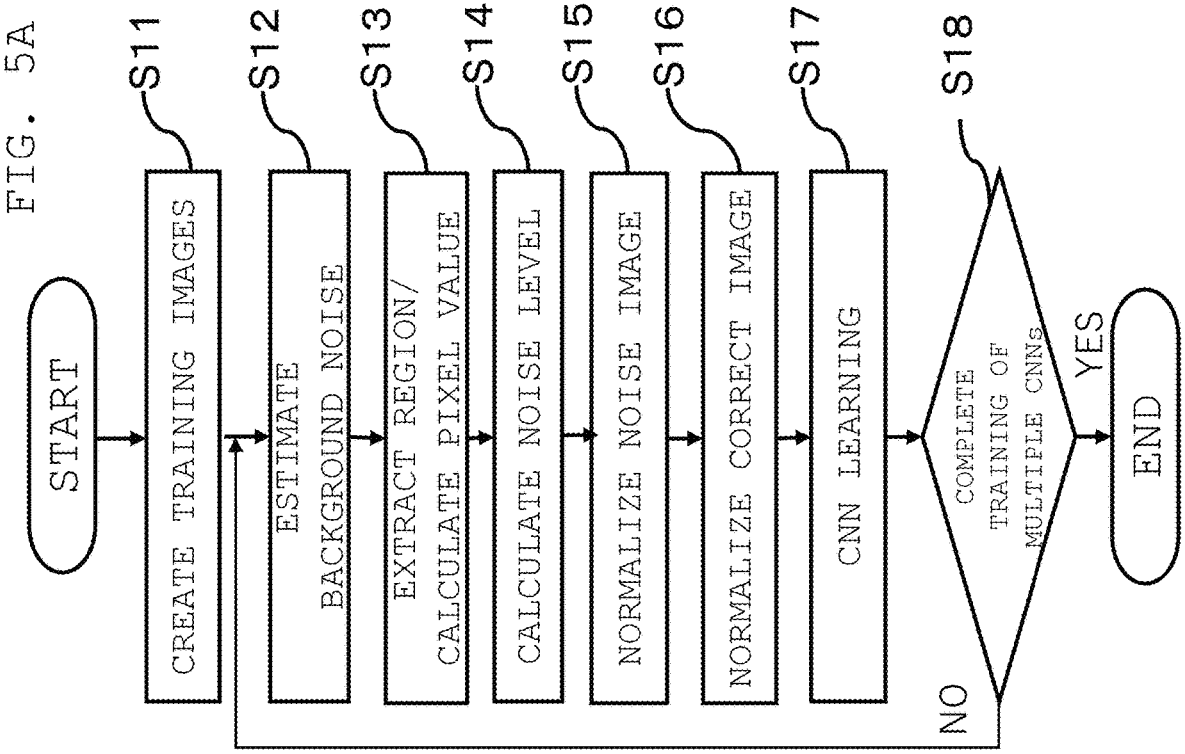
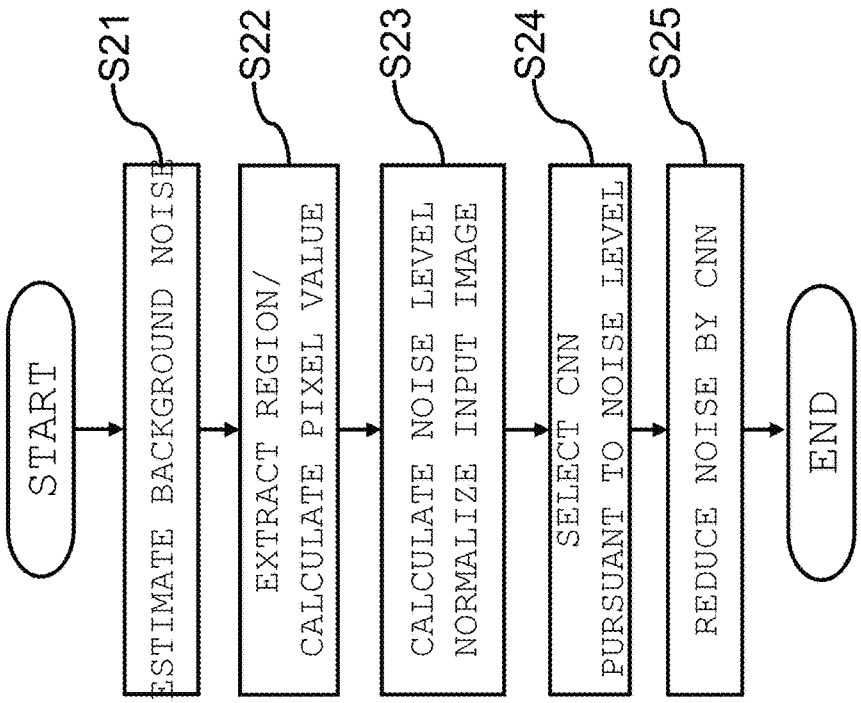

FIG. 8
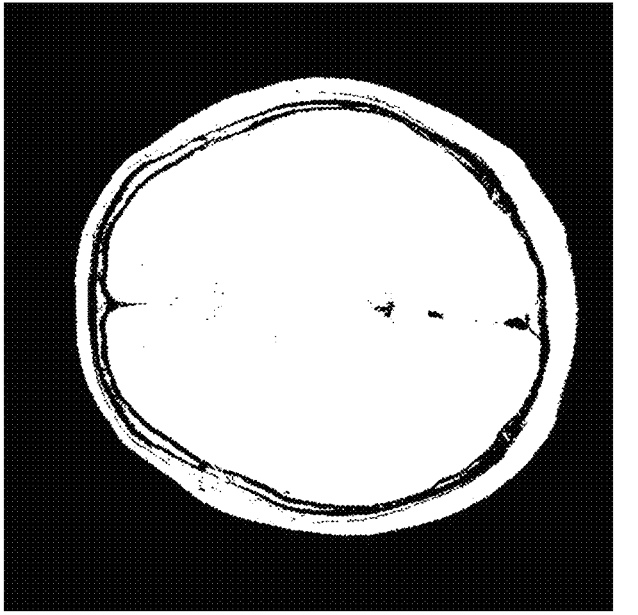
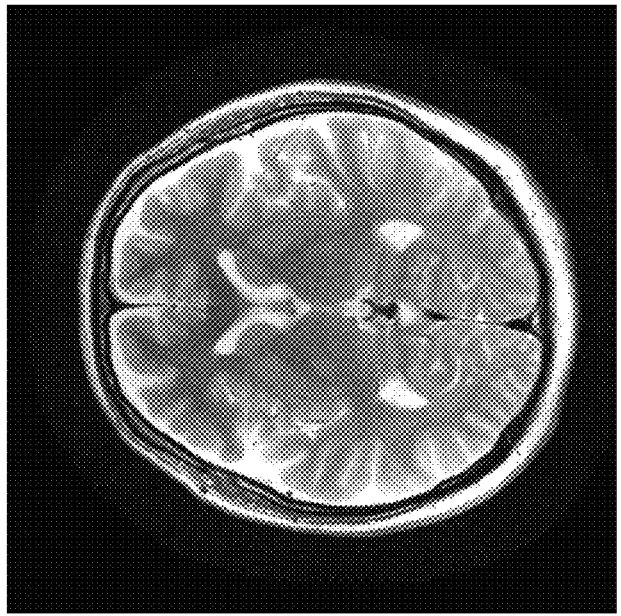

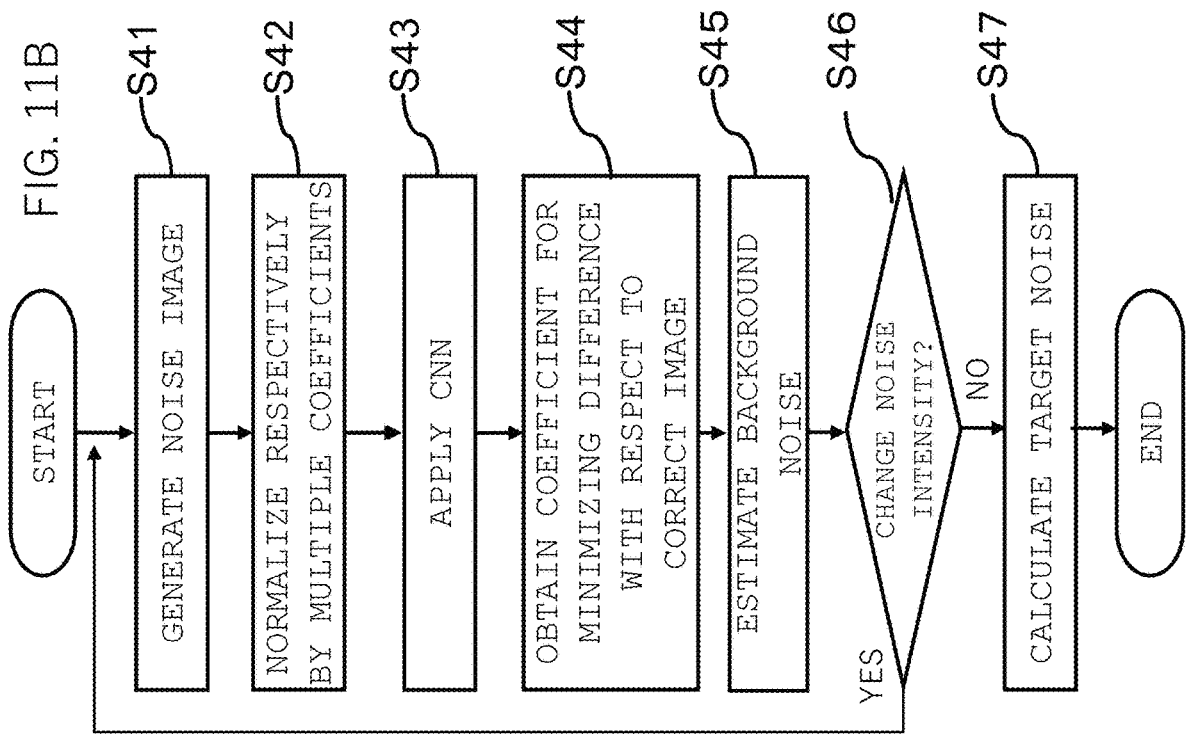
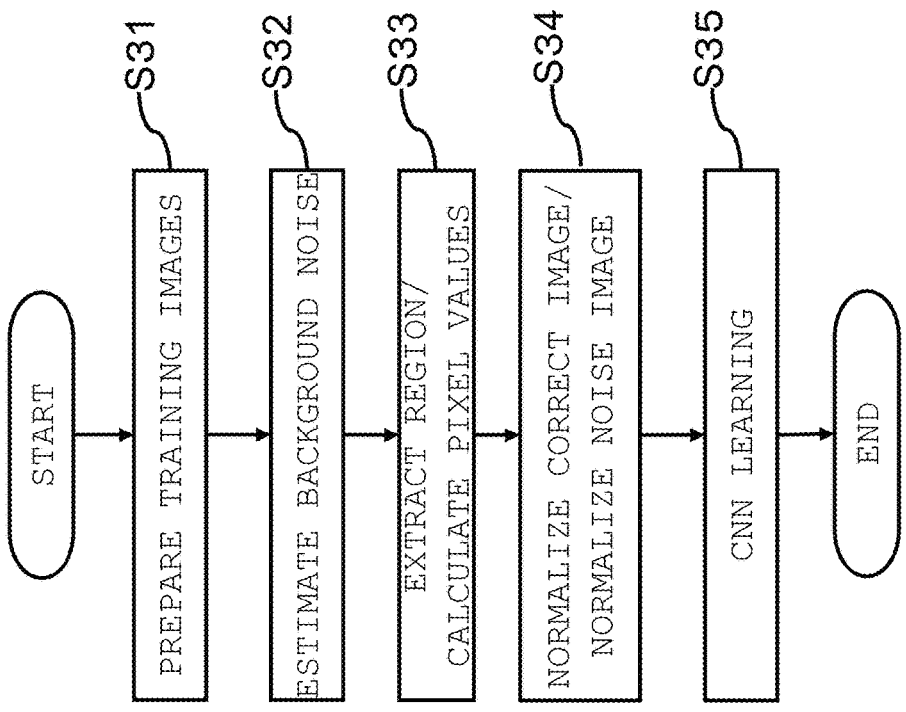
FIG. 11A
FIG. 11B

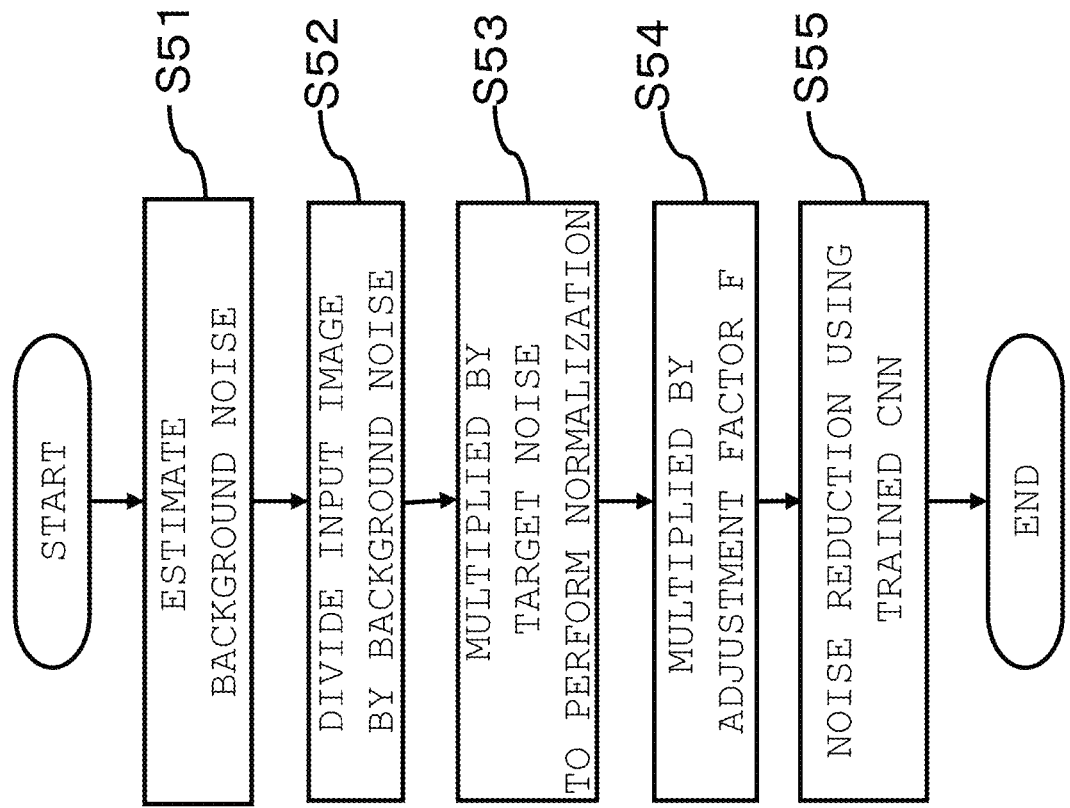

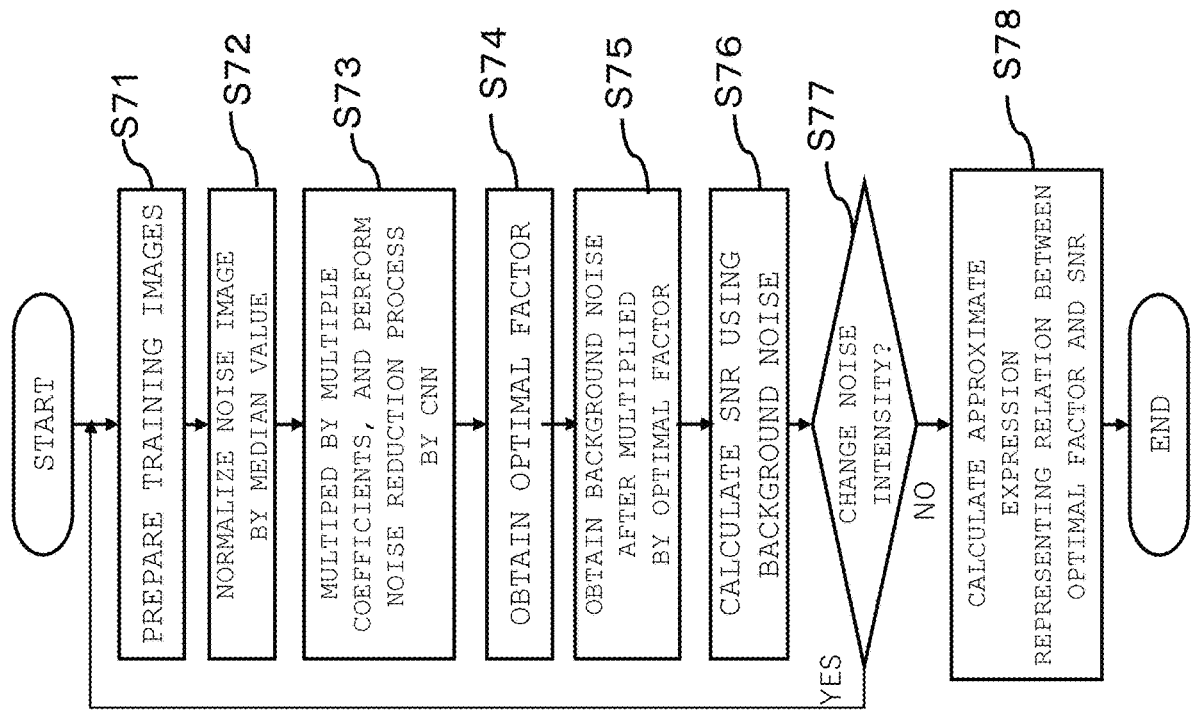
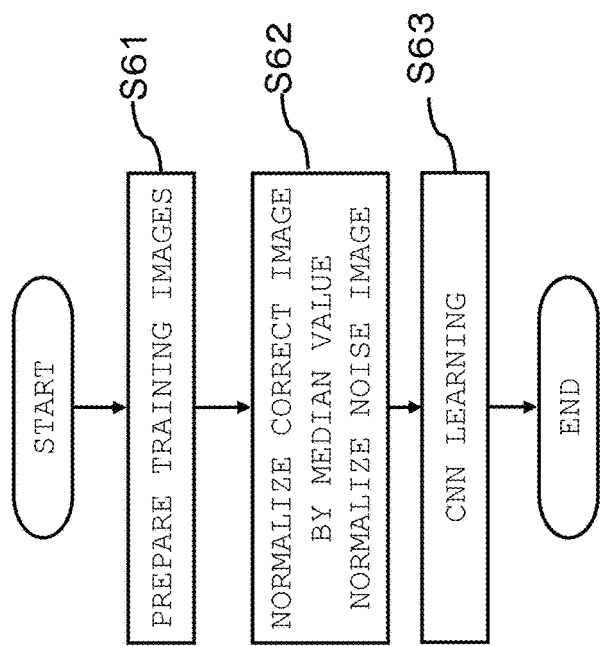
FIG. 15

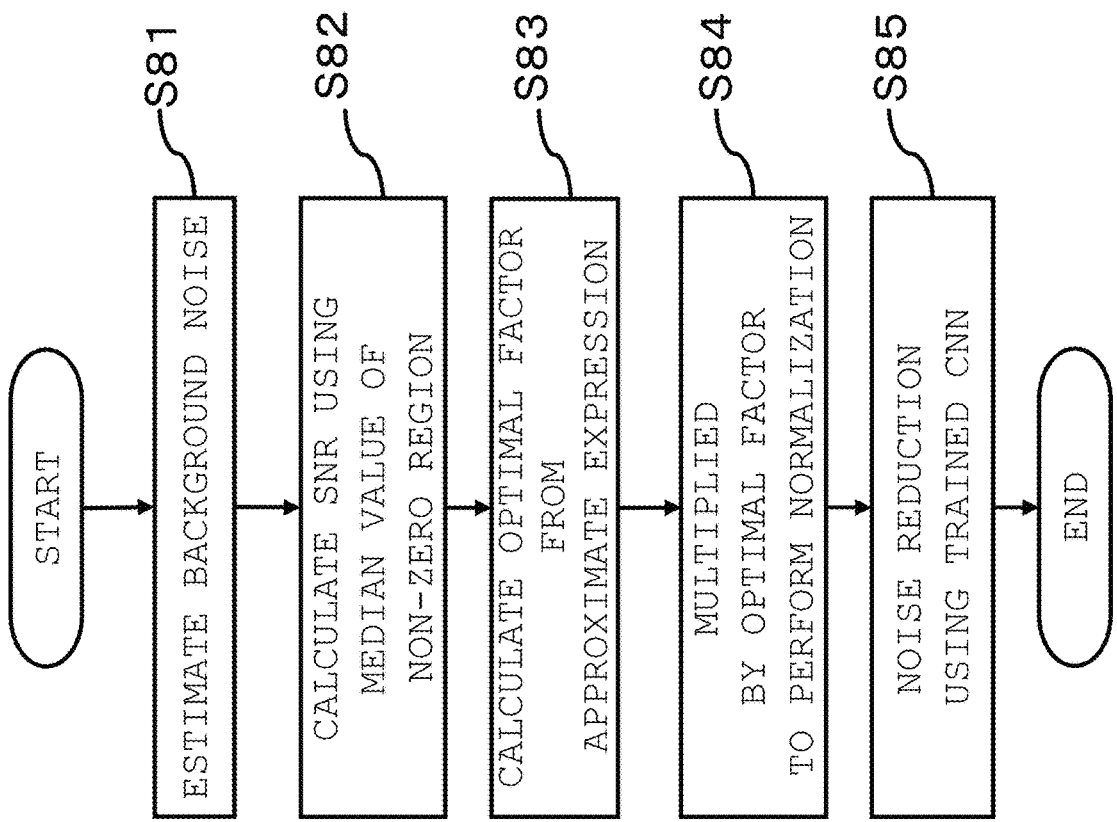

MAGNETIC RESONANCE IMAGING APPARATUS, IMAGE PROCESSOR, AND IMAGE NOISE REDUCTION METHOD

BACKGROUND OF THE INVENTION

Technical Field

The present invention relates to a technique that uses a CNN (Convolutional Neural Network) to reduce noise in a medical image, and more particularly, to a technique for reducing noise in an image obtained by a magnetic resonance imaging apparatus (hereinafter, abbreviated as MRI apparatus).

Description of the Related Art

Medical images acquired by a medical imaging apparatus contain noise due to modality characteristics, imaging conditions, and so on. Although an image with low noise can be obtained by devising the imaging conditions, there is a limit in reducing the noise. For example, an image acquired with a short time is likely to have high noise. Various techniques using the CNN have been proposed as techniques for reducing such noise by post-processing (e.g., US Patent Application Publication No. US 2010/0183217 A1, hereinafter referred to as Patent Literature 1). This technique utilizes the CNN in which an image with much noise (noise image) and an image with less noise (correct image) are provided as training images, and the CNN is trained in such a way that the noise image becomes the correct image. Then, this CNN is applied to an actually-acquired image with much noise, so as to reduce the noise.

When applying the trained CNN, in some cases, an adequate noise reduction effect may not be obtained due to a difference in signal levels between the image (noise image) used for the training and an image (input image) that is inputted when the CNN is applied. In order to prevent inadequate denoising caused by such difference in signal levels, it is common to normalize the image with a maximum value of signal values, in the noise reduction using the CNN (Chinese Patent Application Publication No. CN 113344951 A, hereinafter referred to as Patent Literature 2). This normalization is performed on both the training images and the input image of the CNN.

SUMMARY OF THE INVENTION

Technical Problem

As described in the related art, when pixel values of an image (input image) whose noise is to be reduced are normalized with a maximum value, if the pixel value in the region of interest deviates from the pixel value range in the region of interest of the training images (noise images and correct images), a noise reduction effect of the CNN may not be attained.

An object of the present invention is to perform normalization that allows the pixel values in the region of interest of the input image to fall within a range of the pixel values in the region of interest of the training images, whereby noise can be reduced reliably and effectively.

Solution to Problem

Normalization considering noise is performed according to the present invention, so as to solve the above-described problem.

An MRI apparatus of the present invention comprises a measurement unit configured to measure nuclear magnetic resonance signals generated from a subject, and a calculation unit configured to generate an image using the nuclear magnetic resonance signals, wherein the calculation unit includes a noise reduction unit configured to reduce noise of an input image of a CNN, using the CNN trained with a noise image being normalized and a correct image having less noise than the noise image. The noise reduction unit includes a normalization unit configured to normalize the input image with a normalization factor suitable for the CNN, using noise information and signal level information of the input image, and performs a noise reduction process using the CNN, on the normalized input image.

Functions of the calculation unit in the MRI apparatus can be implemented as an image processor independent of the MRI apparatus, and the present invention includes this type of image processor.

Further, a noise reduction method of the present invention is to reduce noise of an input image of a CNN, using the CNN trained with a noise image being normalized and a correct image having less noise than the noise image, and the noise reduction method includes the steps of normalizing the input image with a normalization factor suitable for the CNN, using noise information and signal level information of the input image, and performs a noise reduction process using the CNN on the normalized input image. The noise reduction method of the present invention can be suitably applied to an image (MR image) acquired by the MRI apparatus.

In the present specification, the "normalization factor" indicates a value used for normalizing an image, and in particular, when the normalization is performed by multiplying a predetermined pixel value by a coefficient (keisu), the coefficient is referred to as a "normalization coefficient".

According to the present invention, the input image is normalized at a signal level estimated with noise information, and the pixel values in the region of interest of the input image can be normalized and processed without deviating from the range of pixel values in the training images for the CNN, and thus noise reduction can be effectively performed on images of various noise levels.

BRIEF DESCRIPTION OF THE DRAWINGS

FIG. 5A illustrates processing steps of the CNN learning unit according to the first embodiment;

FIG. 5B is a flow diagram of the noise reduction process according to the first embodiment;

FIG. 8 illustrates subject region extraction and pixel calculation;

FIG. 11A is a diagram showing the processing steps of the CNN learning according to the second embodiment;

FIG. 11B is a diagram showing the processing steps of target noise setting according to the second embodiment;

FIG. 13 is a flow diagram of the noise reduction process according to the second embodiment;

FIG. 15 shows flow diagrams of the CNN learning steps and approximate expression calculation steps according to the third embodiment;

FIG. 17 illustrates the noise reduction process according to the third embodiment.

DETAILED DESCRIPTION OF THE PREFERRED EMBODIMENTS

There will now be described an embodiment of a noise reduction method according to the present invention. The noise reduction method of the present invention can be suitably applied to an image (MR image) obtained by MRI, though not limited thereto, and in such cases, an MRI apparatus or an image processor that processes the MR image is provided with a function that implements the noise reduction method of the present invention.

Hereinafter, an example of the MRI apparatus will be described as one embodiment of the present invention. First, with reference to FIG. 1, the overall configuration of the MRI apparatus 1 to which the present invention is applied will be described.

Configuration of the MRI Apparatus

Figure 1:
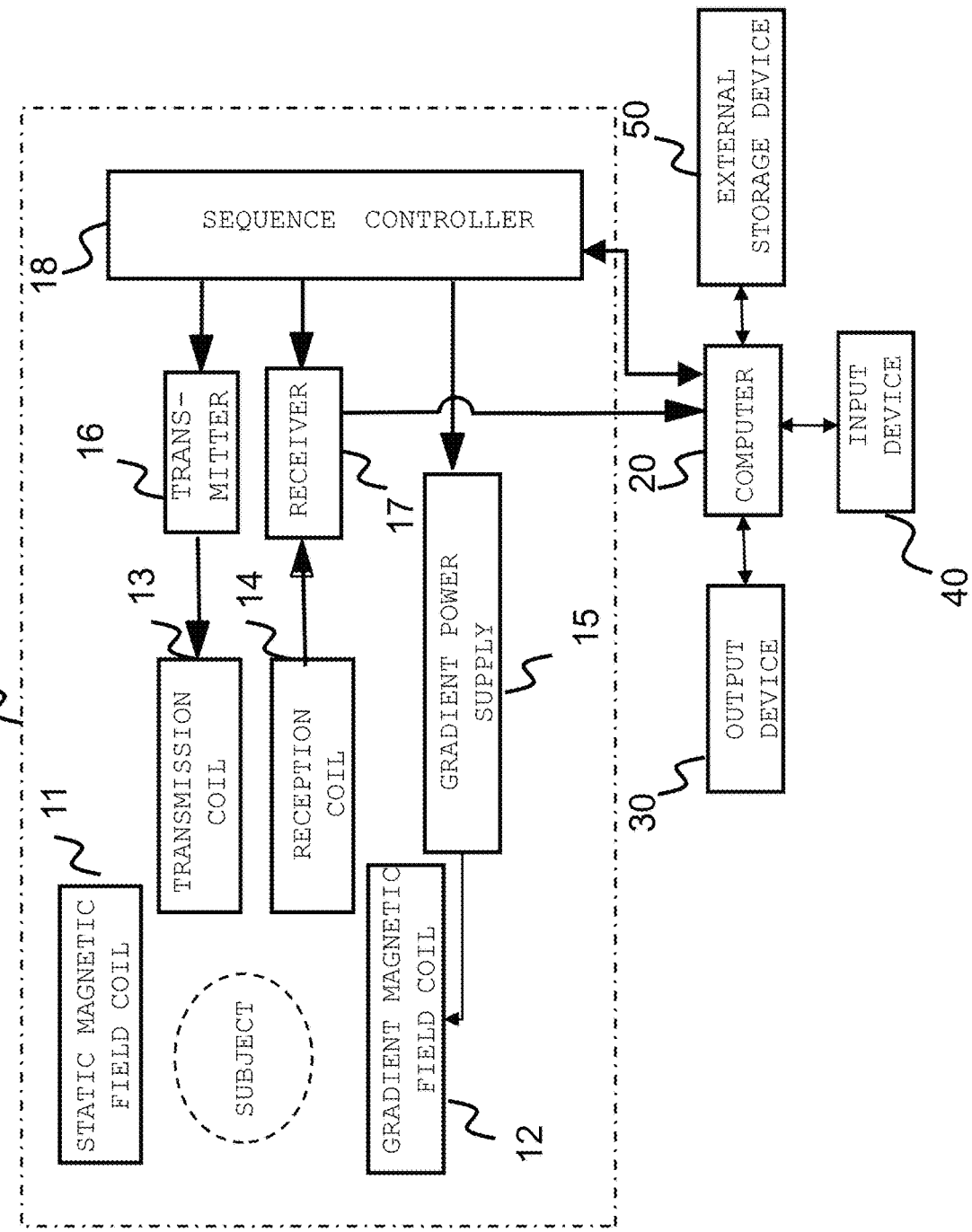
FIG. 1 is a diagram showing an overall outline of an MRI apparatus.

As shown in FIG. 1, the MRI apparatus 1 of the present embodiment includes a static magnetic field generation unit such as a static magnetic field coil 11 configured to generate a static magnetic field in the space where a subject is placed, a transmit RF coil 13 (hereinafter, simply referred to as a transmission coil) and a transmitter 16 configured to transmit an RF magnetic field pulse to a measurement region of the subject, a receive RF coil 14 (hereinafter, simply referred to as a reception coil) and a receiver 17 configured to receive a nuclear magnetic resonance signal generated from the subject, a gradient magnetic field coil 12 configured to apply a magnetic field gradient to the static magnetic field generated by the static magnetic field coil 11, and a gradient power supply that is a driving power supply thereof, a sequence controller 18, and a computer 20. All the units in the MRI apparatus 1 excluding the computer are collectively referred to as a measurement unit 10.

The MRI apparatus 1 includes a vertical magnetic field system and a horizontal magnetic field system depending on the direction of the static magnetic field generated, and various types of the static magnetic field coils 11 are adopted depending on the system. The gradient magnetic field coil 12 comprises a combination of multiple coils generating gradient magnetic fields respectively in three axial directions (x-direction, y-direction, and z-direction) orthogonal to each other, and each of the coils is driven by the gradient power supply 15. By applying the gradient magnetic fields, position information can be added to the nuclear magnetic resonance signals generated from the subject.

In the illustrated example, the transmission coil 13 and the reception coil 14 are separate from each other, but in some cases, a single coil serving as both functions of the transmission coil 13 and the reception coil 14 may be used. The transmitter 16 generates the RF magnetic field emitted from the transmission coil 13. The nuclear magnetic resonance signals detected by the reception coil 14 are sent to the computer 20 through the receiver 17.

The sequence controller 18 controls operations of the gradient power supply 15, the transmitter 16, and the receiver 17, further controls application timing of the gradient magnetic field and the RF magnetic field and receiving timing of the nuclear magnetic resonance signals, and performs measurement. The time chart for the control is referred to as an imaging sequence, and it is set in advance according to the measurement, and stored in a device such as a storage device provided in the computer 20 described later.

The computer 20 is an information processing device including a CPU, a memory, the storage device, and others, and controls the operation of each unit of the MRI apparatus via the sequential controller 18, and performs arithmetic processing on the received echo signals, so as to obtain an image of a predetermined imaging region. Functions implemented by the computer 20 will be described later, and the functions may be implemented as the computer 20 incorporated in the MRI apparatus 1, or may be implemented by another computer, a workstation, or the like, independent of the MRI apparatus. That is, an image processor may be provided, which includes some or all of the functions of the computer 20.

The computer 20 is connected to a display device (output device) 30, an input device (input unit) 40, an external storage device 50, and others. The display device 30 is an interface that shows an operator, for example, a result obtained by the arithmetic processing. The input device 40 is an interface for the operator to enter, for example, conditions and parameters necessary for the measurement and arithmetic processing performed in the present embodiment. The user is allowed to enter via the input device 40, measurement parameters such as the number of echoes to be measured, echo time TE, and echo interval. The external storage device 50 holds, together with the storage device inside the computer 20, data used for various kinds of arithmetic processing executed by the computer 20, data obtained by the arithmetic processing, and the entered conditions, parameters, and others.

As described above, the computer 20 performs the control of the measurement unit 10 of the MRI apparatus and processing of the signals measured by the measurement unit 10. The nuclear magnetic resonance signals measured by the measurement unit are obtained from the subject as signals with noise depending on device characteristics, imaging conditions, and the noise may cause deterioration of the image quality. The computer 20 of the present embodiment has a function, as a part of signal processing, to reduce the noise on the image.

Figure 2:
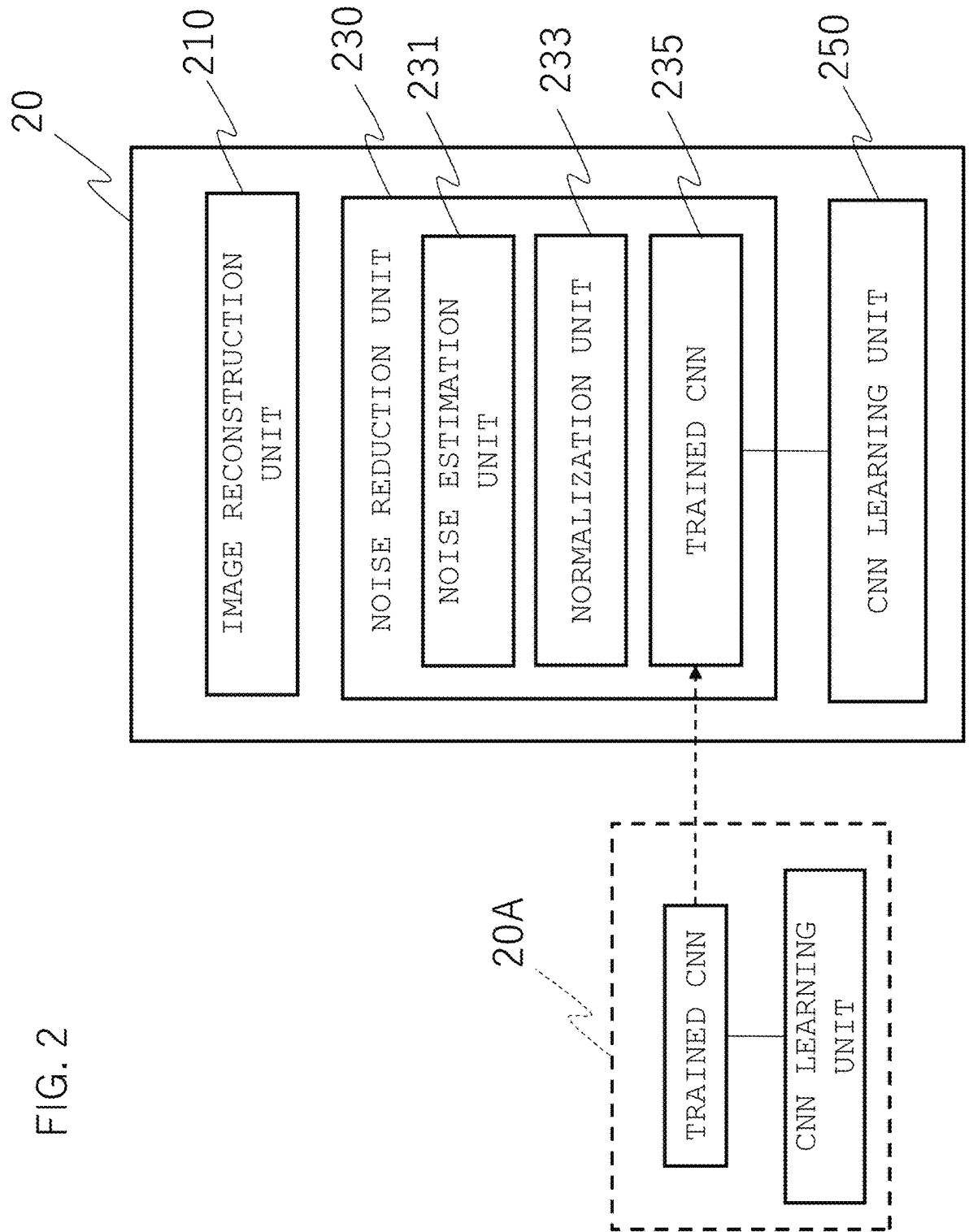
FIG. 2 is a functional block diagram of a computer.

In the present embodiment, this noise reduction is performed using a CNN. For this reason, as illustrated in FIG. 2, the computer 20 includes an image reconstruction unit 210, a noise reduction unit 230, and a CNN learning unit 250. The noise reduction unit 230 further includes a noise estimation unit 231 configured to calculate information related to noise on the image to be processed, a normalization unit 233 configured to normalize the image into predetermined pixel values based on the estimated noise information, and a trained CNN 235. A processing method of the noise reduction unit 230 will be described in detail in the following embodiments.

Further, though not illustrated, the computer may include other units such as a measurement controller configured to control each element of the measurement unit 10, and an image generator configured to generate an image to be displayed on the display device.

In FIG. 2, the CNN learning unit 250 is shown as one of the functions included in the computer 20, but the function of the CNN learning unit 250 can be implemented by another computer, rather than the computer or the image processor of the MRI apparatus 1 to perform the noise reduction process on an actual measurement image. In that case, the CNN learning unit 250 is not provided in the computer 20. As shown by the dotted line in FIG. 2, the CNN learning unit 250 having the same function is provided in another computer 20A. Then, the CNN trained in this CNN learning unit 250 is introduced into the computer 20 of the MRI apparatus 1. Therefore, in the following descriptions, the CNN learning performed by the CNN learning unit 250 includes both the learning performed by the device (for example, the computer 20 of the MRI apparatus) on which the trained CNN is mounted, and the learning performed by another device (computer 20A).

The CNN learning unit 250 performs the CNN learning, using a large number of image pairs, each being a pair of an image including noise (noise image) and an image having no noise or less noise than the noise image (correct image), so as to output the correct image in response to the input of the noise image. At this time, normalization is performed on the image used for the learning (training image) based on noise intensity of the used noise image, and then the trained CNN is obtained.

Figure 3:
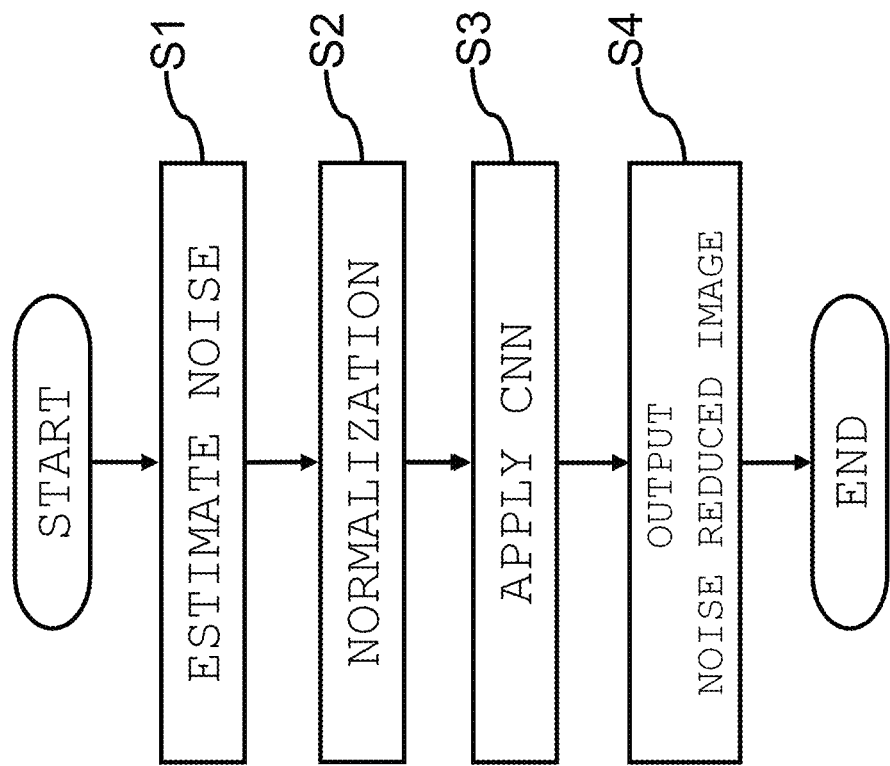
FIG. 3 is a diagram showing an outline of noise reduction process.

The noise reduction unit 230 uses the trained CNN 235 to perform the noise reduction process. Prior to applying the trained CNN 235 to an image (input image) as a target of the noise reduction, the noise reduction unit 230 performs normalization suitable for the trained CNN, on the input image in accordance with the noise thereof. Therefore, as shown in FIG. 3, the noise estimation unit 231 estimates a noise level of the input image (S1). Then, the normalization unit 233 performs normalization on the input image, on the basis of the estimated noise level, so that the pixel values of the input image falls into an appropriate range with respect to a range of pixel values of the training image (normalized training image) of the trained CNN 235 to be applied (S2). The noise reduction unit 230 inputs thus normalized input image into the CNN 235 and performs the noise reduction process (S3). If required, an image outputted from the CNN is subjected to a process to convert the normalized pixel values to the pixel values prior to the normalization, and then an image where noise has been reduced is outputted (S4).

As described above, according to the present embodiment, the noise reduction unit 230 uses the CNN trained with the training image having been normalized based on the noise level. In applying the trained CNN, the input image is normalized based on the noise level of the input image so as to fall within the pixel value range of the trained CNN, and then noise reduction is performed. Accordingly, it is possible to solve the problem that the pixel values in the region of interest of the input image deviate from the pixel value range of the CNN training image and the noise reduction effect is lowered. Thus, noise reduction can be reliably performed on the images of various noise levels.

There will now be described specific embodiments of the method that normalizes the input image to perform the noise reduction.

First Embodiment

In the present embodiment, multiple CNNs having different noise levels are prepared, a CNN having the same noise level is selected from the plurality of CNNs pursuant to the noise level of the input image. Then, after the input image is normalized in the same manner as the selected CNN, noise reduction is performed. In order to perform the processing pursuant to the noise level, the noise level of the input image is estimated.

In estimating the noise level, the present embodiment utilizes a property of an MR image, i.e., the noise level of air is proportional to the noise of the image itself. That is, the noise level of the air, namely, background noise, is estimated, and a normalization coefficient is determined using thus estimated background noise. This normalization is performed on the image that is inputted in the CNN, on both two stages; on the CNN learning stage and the CNN application stage.

Figure 4B:
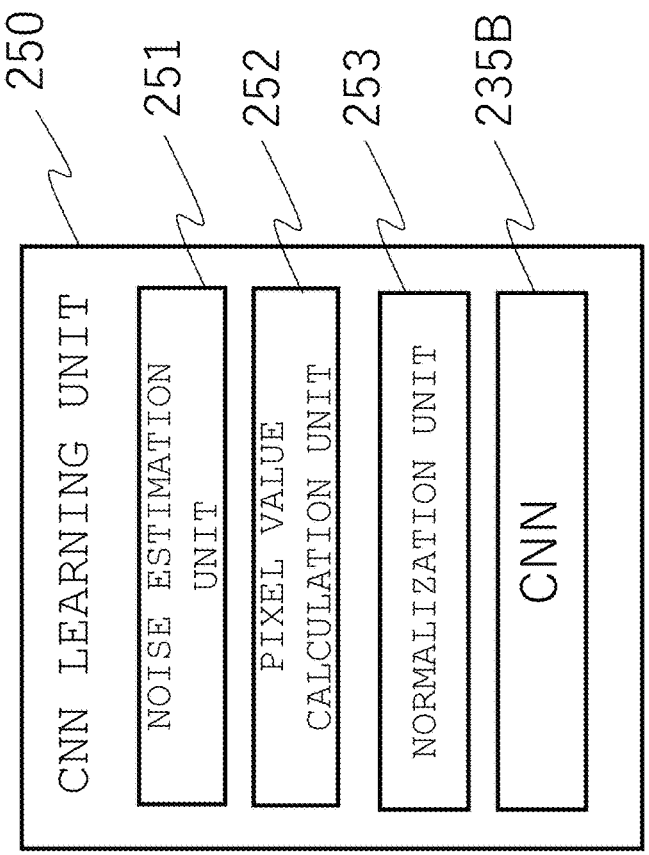
FIG. 4B is a functional block diagram of a CNN learning unit according to the first embodiment.
Figure 4A:
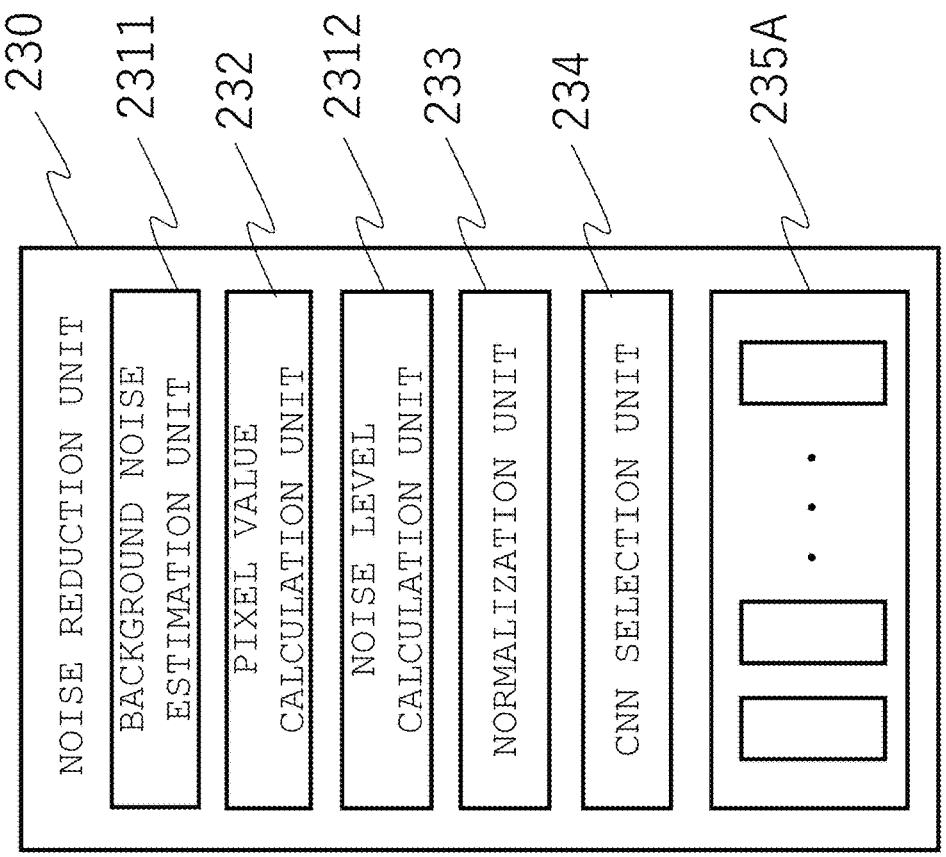
FIG. 4A is a functional block diagram of a noise reduction unit according to a first embodiment.

As shown in FIG. 4A, the noise reduction unit 230 of the present embodiment includes a background noise estimation unit 2311 configured to estimate the magnitude of the background noise of the image (input image) as a target of the noise reduction process, a pixel value calculation unit 232 configured to extract a subject region based on the estimated magnitude of the background noise and to calculate a pixel value of the region, and a noise level calculation unit 2312 configured to calculate the noise level using the pixel values of the image in the subject region. Further, the noise reduction unit 230 includes a CNN selection unit 234 configured to select a CNN to be used in processing the input image, from multiple CNNs 235 trained with respect to each noise level. Other elements having the same functions as those shown in FIG. 2 are denoted by the same reference numerals.

As shown in FIG. 4B, the CNN learning unit 250 is provided with functional units (251, 252, 253, and others), respectively corresponding to the functions of the noise reduction unit 230, that is, the functions of the noise estimation unit 231, the pixel value calculation unit 232, and the normalization unit 233.

Referring to the processing flowcharts shown in FIGS. 5A and 5B, the noise reduction process according to the present embodiment will be described below. FIG. 5A is a flowchart showing the CNN learning stage, and FIG. 5B shows a processing flow of the noise reduction.

First, the CNN learning performed by the CNN learning unit 250 will be described. In the following description, when distinguishing between the pre-training CNN and the post-training CNN, the former is referred to as CNN 235B, and the latter is referred to as CNN 235A. When such distinguishment is not required, it is generally referred to as CNN.

The CNN learning unit 250 performs predetermined normalization on the training image to be inputted into the CNN 235B, and performs repetitive calculation using thus normalized training image, so that learning is performed to output a noise-reduced image in the CNN.

Figure 6:
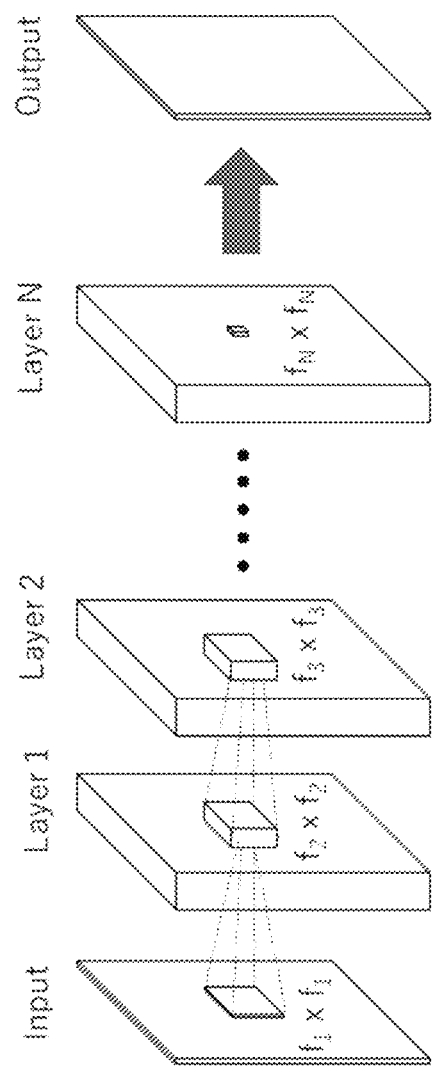
FIG. 6 illustrates a configuration example of a CNN.

As shown in FIG. 6, the CNN 235 is available as publicly known software having a structure in which multiple layers (convolutional layers and pooling layers) are stacked between an input layer and an output layer, with the setting of the number of layers and the kernel size of each layer. The number of layers and the kernel size, and so on, may be customized appropriately.

The CNN 235B uses a large number of training images and repeats the input and output, thereby determining coefficients (biases, kernels, and others) used in the CNN, so as to output the noise-reduced image, and ultimately the trained CNN 235A is obtained. In the present embodiment, in MRI for example, there is used as the training images, a set of an image (correct image) having a higher SNR (signal to noise ratio) obtained by performing the same imaging more than once and adding up those images, and an image (referred to as a noise image) obtained by adding noise to the correct image. As the noise to be added, for example, noise having a predetermined distribution such as Gaussian noise can be used. It is also possible to use as the training images, a set of the correct image with a lower SNR obtained by adding noise to an image having a high SNR, and the noise image obtained by further adding noise to the correct image with the lower SNR. By using the correct image with the lower SNR for the learning, excessive noise reduction is prevented, producing an effect of natural-looking noise graininess in the image after noise reduction.

Further, in the MRI, a plurality of contrast images such as T2 weighted images and T1 weighted images can be acquired, and in some cases, learning is performed with mixing such multiple contrast images. In this case, the SNR of the correct image may differ for each contrast image. Therefore, noise to be added to a high SNR correct image is adjusted for each contrast image, and this enables generation of low SNR correct images in which the SNR for each contrast image is standardized. The noise being identical in the contrast images is added to the low SNR correct image being generated, whereby the SNR ratio between the correct image and the noise image can be standardized among the contrast images.

Figure 7:
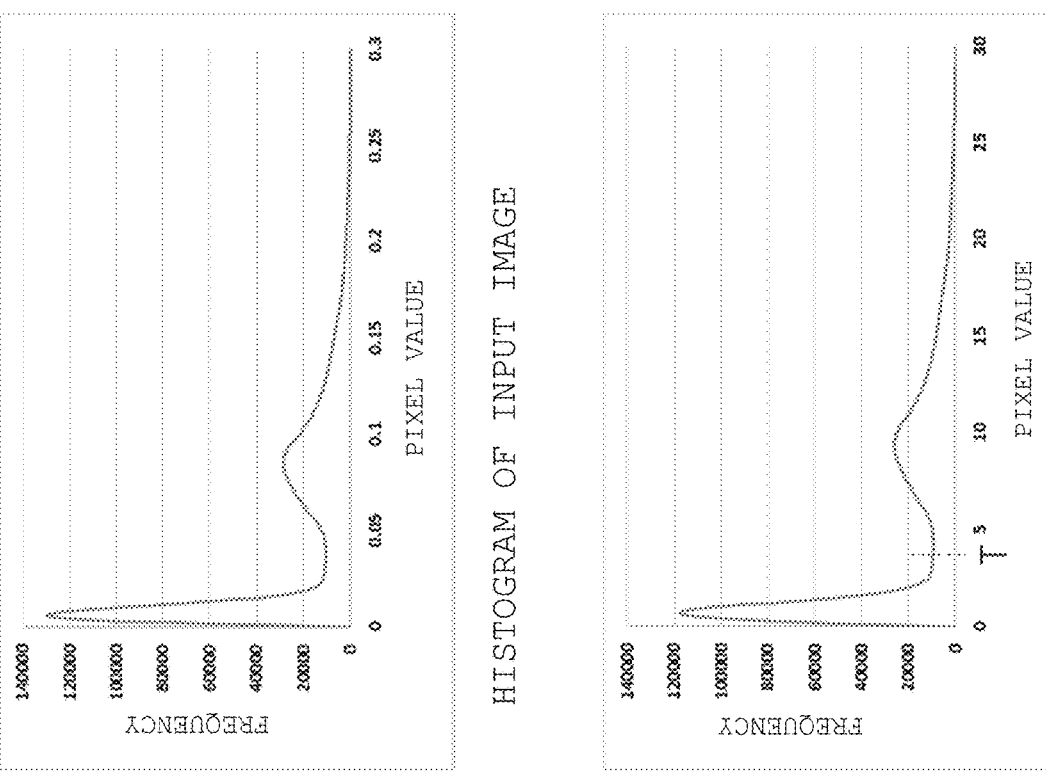
FIG. 7 illustrates estimation of background noise and region extraction.

Prior to the learning, the CNN learning unit 250 varies the noise level to generate noise images for training with respect to each noise level (FIG. 5A: S11), and normalizes the training image with a normalization coefficient (normalization factor) determined using the noise information. For this purpose, when a pair of training images having predetermined noise levels are inputted, the CNN learning unit 250 estimates the magnitude N of the background (air) noise outside the region of interest of the noise image (S12). As a method of the noise estimation, for example, according to a histogram of the noise image as shown in FIG. 7, a peak having the lowest signal value and the highest frequency is determined as background noise, and the signal value of the noise image is assumed as the noise magnitude N (hereinafter, simply referred to as background noise N).

Next, the subject region is extracted (S13). Extraction of the subject region is performed by dividing the entire noise image (each pixel value) by the background noise N, and extracting a pixel whose value is equal to or larger than a predetermined threshold T being more than 1 (one). The lower side of FIG. 7 shows the relation between the histogram of the image divided by the background noise N and the threshold value. An image having the pixel values equal to or larger than the threshold T is extracted as the subject region. FIG. 8 shows the images before and after the extraction. The pixel value calculation unit 232 calculates the mean value M of the pixel values of the extracted region of the image divided by the background noise N. In addition, 1/M (=L) is calculated, and L is set as the noise level of the noise image (S14).

The CNN learning unit 250 (normalization unit) divides the entire noise image (the image divided by the noise N) by the mean value M of the pixel values obtained for the extracted image. In this way, the noise image is normalized by the mean M of the pixels in the extracted region (S15). Then, the correct image is multiplied by (1/N)/M to perform normalization (S16). As a result, the correct image is normalized in the same manner as the noise image.

Training of the CNN 235B is performed using a pair of the correct image and the noise image normalized in this way, and the trained CNN is obtained (S17). The processing steps S11 to S17 are repeated (S18) with varying the magnitude of the noise to be added to the correct image, and finally, the CNN 235A is generated for each of multiple noise levels.

As the region extracting method in the processing step S13, the method employing the histogram used in S11 as described above is convenient, but other methods may also be adopted. For example, the subject region is extracted according to a method for extracting the region by tracking the outline of the subject region or a region expanding method, and the remaining region after excluding the subject region is assumed as the background region to obtain the noise from the pixel values of the background region.

It is also possible to use an image in which noise is reduced in advance, as the image for calculating the pixel values of the subject region. This type of image can be obtained, for example, by performing processing using a publicly known noise reduction filter, or by changing a matrix size of the image (for example, adding adjacent pixel values of an image of 256×256 to reduce the image to the size such as 128×128).

Next, there will be described a processing flow of the noise reduction unit 230, using the CNNs 235A respectively for the multiple noise levels generated by the CNN learning unit 250.

Also in the noise reduction unit 230, the process of normalizing the input image is the same as the normalization in the CNN learning process. First, the background noise estimation unit 2311 extracts from the input image, a region (background) other than the subject region, and estimates the background noise N (S21). Next, the pixel value calculation unit 232 divides the input image by the noise N, extracts a region that is equal to or larger than the predetermined threshold as the subject region, and calculates the mean value M of the pixel values of the extracted region (S22). The normalization unit 233 divides the entire input image (the input image after divided by N) by the mean value M, and normalizes the input image (S23). The noise level calculation unit 2312 calculates the noise level L (=1/M) of the input image. In this way, the input image is normalized using the noise level and the pixel value (signal level) as normalization factors.

In the CNN learning process, the noise reduction unit 230 selects from multiple CNNs 235A having been generated, a CNN 235A in which the noise level L is the same as or the closest to the noise level calculated for the input image (S24), enters the input image into thus selected CNN 235A, and obtains an image in which noise has been reduced, as an image outputted from the CNN 235A (S25).

As described above, the trained CNNs are prepared for respective noise levels, and the CNN 235A pursuant to the noise level of the input image is selected. Then, normalization is performed using the noise level and the signal level as the normalization factors in the same way as the training image of the CNN 235A, and this CNN 235A is applied to the input image. Accordingly, it is possible to perform effective noise reduction on images having various signal levels and noise levels, without impairing the noise reduction effect.

Figure 9:
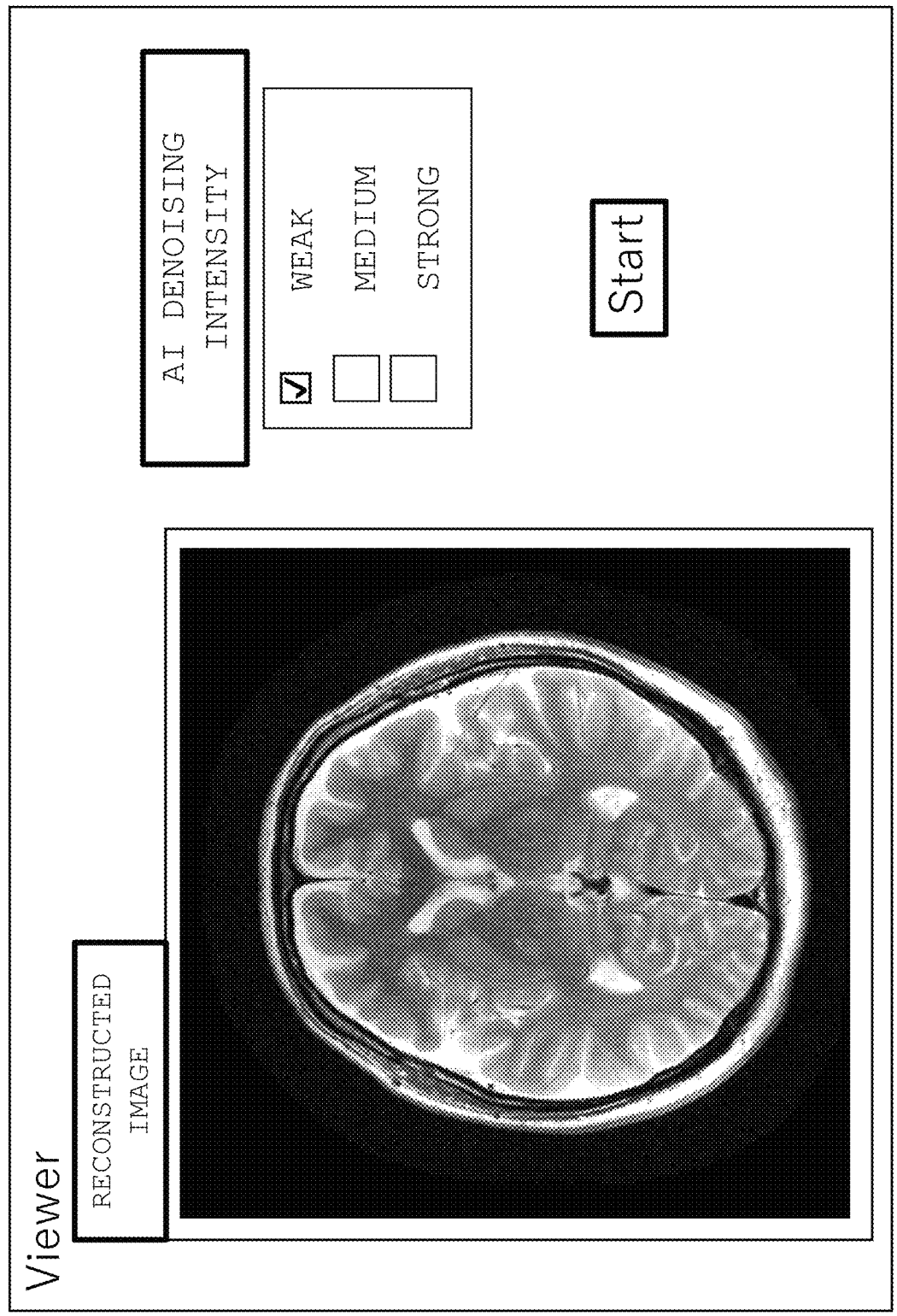
FIG. 9 illustrates an example of a GUI related to denoising intensity.

In the present embodiment, there has been described the case that a predetermined CNN is selected from multiple CNNs pursuant to the noise level, but the CNN may be selected in accordance with a denoising degree desired by a user. For example, the GUI as illustrated in FIG. 9 may be displayed on the display device 30, and any of the strength may be selected in accordance with the denoising strength selected by the user. As an example, the CNN having the noise level closest to the noise level of the input image $L_{input}$ is referred to as $NL_{medium}$, the CNN with lower noise level is referred to as $NL_{light}$, and the CNN with higher noise level is referred to as $NL_{heavy}$. In this case, when the denoising intensity "weak" is selected, the $NL_{light}$ is selected as the CNN to be applied, and when the denoising intensity "strong" is selected, $NL_{heavy}$ is selected, for instance.

By providing this kind of GUI, it is possible to increase the user's degree of freedom in selecting the denoising strength.

Further, in the present embodiment, there has been described the case where one CNN 235A in association with the input image having one noise level is selected and applied, but two or more CNNs 235A may be used. For example, two CNNs 235A close to the noise level of the input image may be selected and applied, and the outputs from the two may be combined.

Second Embodiment

In the first embodiment, a plurality of CNNs 235A having different noise levels are prepared, and one or more CNNs are selected pursuant to the noise level of the input image. Then, the input image is normalized so that the pixel values fall within the same pixel value range as the training image of the selected CNN 235A, and noise reduction is performed. In the present embodiment, one CNN 235A is created, and when this one CNN 235A is applied, the input image is normalized using different coefficients (normalization coefficients) depending on the noise level, so as to be normalized to fall within an optimal pixel value range. A target noise level (target noise) is determined when the prepared CNN is applied, and the normalization coefficient is set to a value (a range of values) that achieves the target noise for each noise level.

Figure 10:
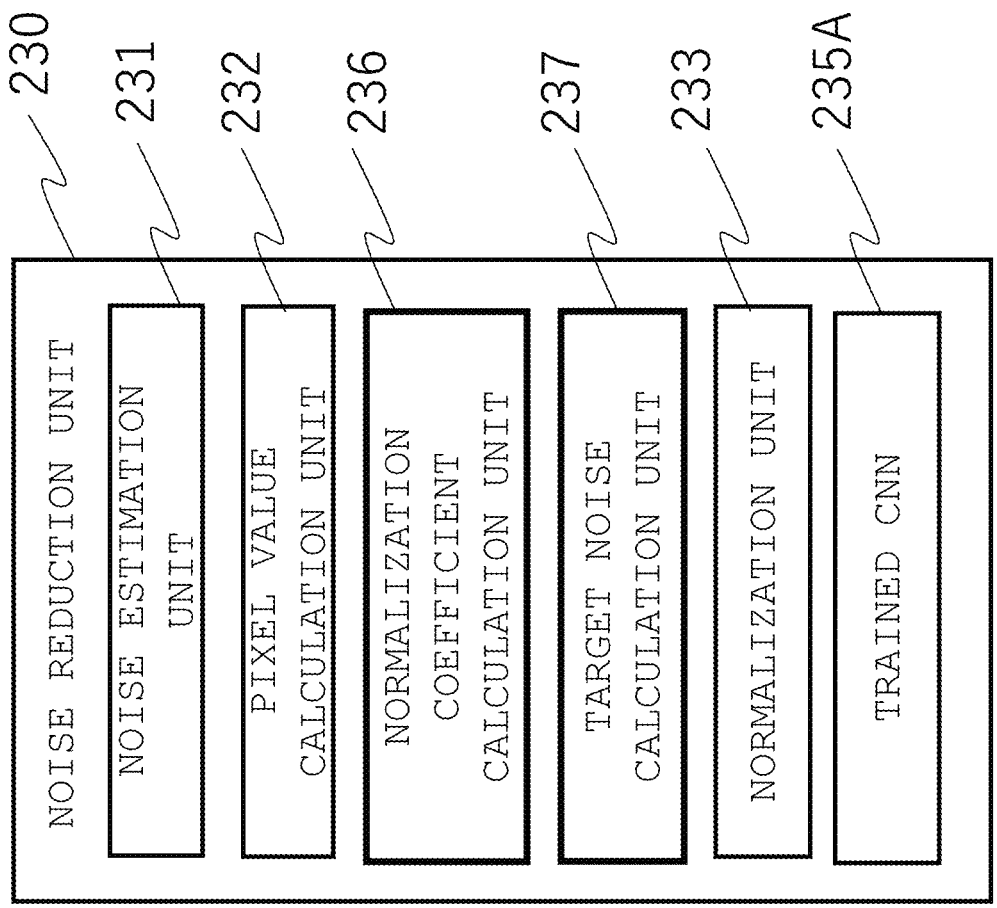
FIG. 10 is a functional block diagram of the noise reduction unit according to a second embodiment.

FIG. 10 shows the configuration of the noise reduction unit 230 according to the present embodiment. In FIG. 10, elements having the same functions as those in FIGS. 2 and 4 are denoted by the same reference numerals, and redundant description thereof will not be given. As in the case of the first embodiment, the functions of the CNN learning unit 250 can be implemented by a device separate from the MRI apparatus or the image processor that performs noise reduction.

As illustrated in FIG. 10, in the noise reduction unit 230 of the present embodiment, the normalization coefficient calculation unit 236 and the target noise calculation unit 237 are added in the noise reduction unit 230 of the first embodiment. The normalization coefficient calculation unit 236 calculates a normalization coefficient that minimizes a difference between the noise image and the correct image. The target noise calculation unit 237 uses the CNN 235A created by the CNN learning unit 250 to calculate as the target noise, normalized noise (optimal background noise), normalized with the normalization coefficient calculated by the normalization coefficient calculation unit 236 using various noise images with different noise levels. The normalization unit 233 performs normalization of the input image using the target noise. Though not illustrated, similar to the first embodiment, the CNN learning unit 250 has the functions corresponding to the noise reduction unit 230.

With reference to FIGS. 11A to 13, there will now be described processing of the CNN learning and the noise reduction according to the present embodiment. FIGS. 11A and 11B are the flowcharts and FIGS. 12A and 12B are explanatory diagrams, illustrating the processing of the CNN learning and the target noise setting, and FIG. 13 illustrates the noise reduction process.

First, there will be described the CNN learning (normalization of the training image prior to the CNN learning) in the CNN learning unit 250.

As in the first embodiment, the correct image and the noise image are prepared in a pair (S31). Noise with a predetermined noise level can be used for the noise image. Next, the background (air) noise N outside the subject region of the correct image is estimated (noise estimation function) (S32). The entire correct image is divided by the background noise N (S33), and a region (i.e., the subject region) having pixel values larger than a threshold T (T>1) is extracted from the correct image divided by the noise N.

In the first embodiment, the estimation of the noise N and the extraction of the subject region are performed with respect to the noise image in the processing steps S12 and S13 corresponding to the processing steps S32 and S33 described above. In the present embodiment, the normalization is not performed differently for each noise level, and thus it is not necessary to use the noise image. Therefore, the correct image is used for the estimation. It is also possible, however, to use the noise image similar to the first embodiment.

The mean value M of the pixels in the extracted subject region is calculated, and the correct image is divided by the calculated mean value M. Thus, the correct image is normalized by the pixel value (mean value) of the extracted region. Then, the noise image is multiplied by (1/N)/M and the noise image is normalized (S34). To perform the CNN learning using a pair of the correct image normalized in the step S34 and the noise image (S35) is the same as in the first embodiment. The repetition of the CNN learning for each noise level (FIG. 5A: S18) is not necessary, and a single CNN 235A is created.

Next, the target noise is provided. In order to provide the target noise, the normalization coefficient calculation unit 236 first calculates the normalization coefficient that minimizes the difference between the input image and the correct image, when the CNN 235A created by the CNN learning unit 250 is applied to various images having different noise intensity. Next, the target noise calculation unit 237 obtains background noise of the image prior to the noise reduction, having been normalized with the normalization coefficient calculated by the normalization coefficient calculation unit 236, and determines the optimal range of the background noise as the target noise.

Specifically, as in the process at the time of the CNN learning, noise is added to the correct image to generate the noise image (S41). The noise image is multiplied by a plurality of coefficients ($K_{min}$ to $K_{max}$) to obtain noise images of the same number as the number of coefficients (S42), and noise reduction using the trained CNN is performed on these noise images (S43). The output from the trained CNN, i.e., the noise-reduced images, are divided by the respective coefficients ($K_{min}$ to $K_{max}$) and then the root mean square error (RMSE) with respect to the correct image is calculated to obtain a coefficient (Kj) that minimizes this value (S44). Then, the background noise N' is estimated for the noise image prior to the noise reduction after multiplied by the factor (Kj) (S45). The method being the same as the method of estimating the background noise for the correct image in the CNN learning, may be employed for estimating the background noise N'.

The processing steps S41 to S45 are performed with varying the noise intensity (S46), and for each of the noise images having different noise intensity, there are obtained the coefficient Kj that minimizes the RMSE with respect to the correct image, and the background noise N' of the noise image prior to the noise reduction after multiplied by the coefficient Kj. Then, the tolerance (optimal background noise) of the background noise N' of each noise image is determined as the target noise (S47).

Figure 12A:
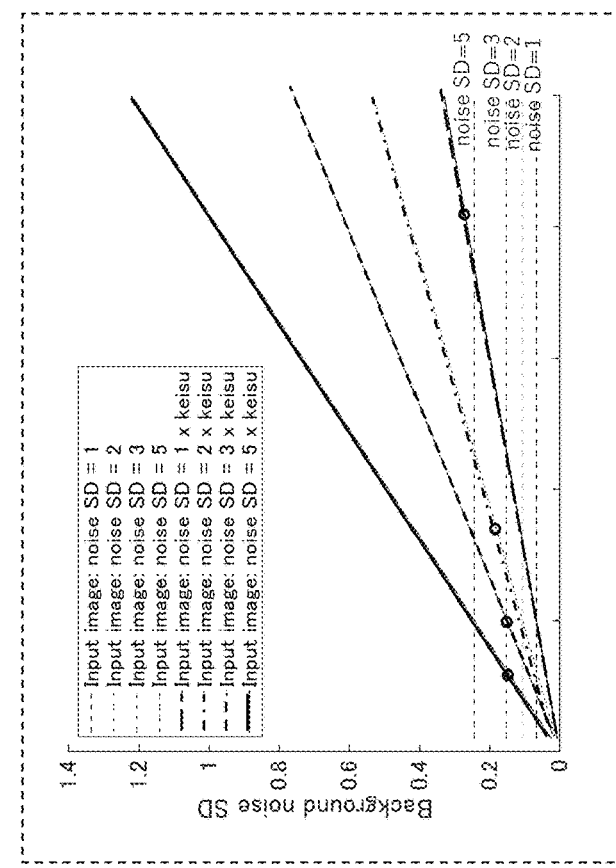
FIG. 12A illustrates the details of the target noise setting.
Figure 12B:
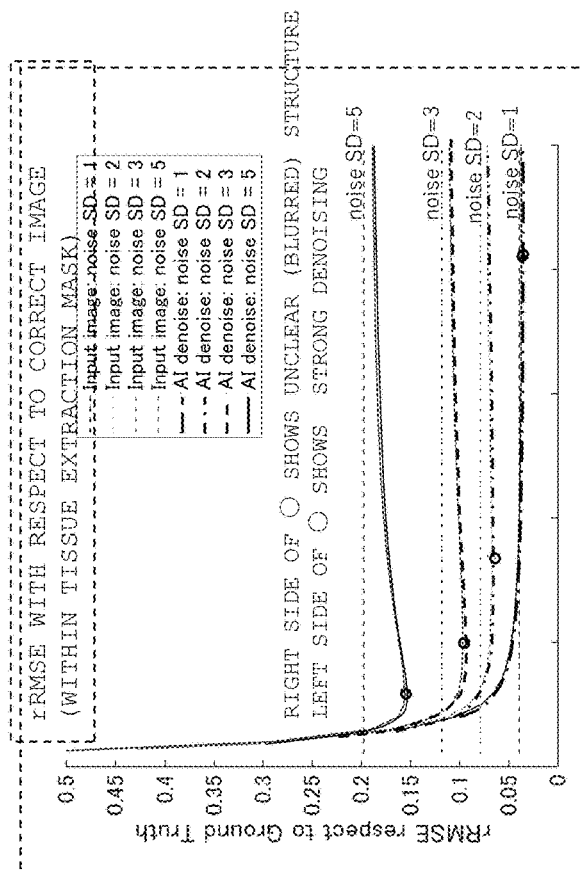
FIG. 12B illustrates the details of the target noise setting.

With reference to FIGS. 12A and 12B, there will be described details of the target noise calculation. FIG. 12A illustrates the relation between the coefficient (keisu) and the RMSE in the case where noise is reduced with varying the coefficient, as to four noise images with different noise intensity, and the coefficient at the position where the RMSE is the smallest (position indicated by "o" in the figure) is Kj. The noise intensity is represented by "noise SD", and FIG. 12A shows four cases where the noise SD is changed to 1, 2, 3, and 5. This graph shows, in the input image of noise SD=5 (noise intensity is minimum), the difference (RMSE) with respect to the correct image is minimized when Kj≈0.6, in the input image of noise SD=3, the difference (RMSE) with respect to the correct image is minimized when Kj≈1. This indicates that the higher is the noise intensity, the value of Kj that minimizes the RMSE becomes smaller.

FIG. 12B is a graph showing the relation between the coefficient (keisu) and the background noise N' for four noise images with different noise intensity, and also indicates by "0" the position of Kj that brings about the smallest RMSE as shown in the graph of FIG. 12A. The target noise calculation unit 237 calculates as the target noise, a value within the range of the background noise where the values Kj of the respective noise intensity fall therein. In FIG. 12B, Kj points (four points) obtained respectively for the four noise images have background noise N' (N'(SNR1), N'(SNR2), N'(SNR3) and N'(SNR4)) ranging from approximately 0.18 to 0.22. For example, the target noise calculation unit 237 calculates a mean value or a median value of these four background noises N' and sets the value as the target noise.

According to the processing described so far, creation of the trained CNN and setting of the target noise are completed. Using this trained CNN and this target noise, the noise reduction unit 230 processes the input image. With reference to FIG. 13, there will now be described the noise reduction process.

First, the background (air) noise N outside the region of interest of the input image is estimated (S51), and the entire input image is divided by the noise N (S52). The input image (divided by the noise N) is then multiplied by the target noise (S53). As a result, the input image is normalized so that the background noise falls within an optimal range. The normalized image without any further change may be used as the input image of the trained CNN for the noise reduction process. In the present embodiment, however, the noise image after the normalization is multiplied by an adjustment factor F for adjusting the denoising intensity and then inputted into the trained CNN (S54) so as to obtain an output image from which the noise has been reduced (S55).

The adjustment factor F is a value predetermined in association with the denoising intensity, for example, F=2.0 when the denoising intensity is weak (Light), F=1.0 when the denoising intensity is medium (Medium), and F=0.5 when the denoising intensity is strong (Heavy). Multiplication by this factor F allows the input image to be normalized with the background noise×factor F, enabling increase or decrease of the denoising intensity. A user may specify via the GUI as shown in FIG. 9 that is referred to in describing the first embodiment, which adjustment factor is to be used. Alternatively, it may be provided as s predefined value pursuant to the noise level.

According to the present embodiment, the target noise (optimal background noise) for applying the trained CNN is determined in advance, and the input image is normalized by the target noise, so that the noise reduction process can be achieved with one trained CNN even for the input images having different noise levels. Further, in addition to the target noise, the adjustment factor F is provided in association with the denoising intensity, and this enhances the versatility of the processing.

Third Embodiment

The third embodiment is also similar to the second embodiment in that one trained CNN is used for the input images having various noise levels (images for the noise reduction process). In the second embodiment, the input images are normalized so that the target noise becomes optimum when the trained CNN is applied. On the other hand, in the present embodiment, the normalization coefficient is calculated as a function of the signal-to-noise ratio (SNR). Then, the SNR of the input image is estimated, and the normalization coefficient is obtained from the SNR in order to normalize the input image.

Figure 14:
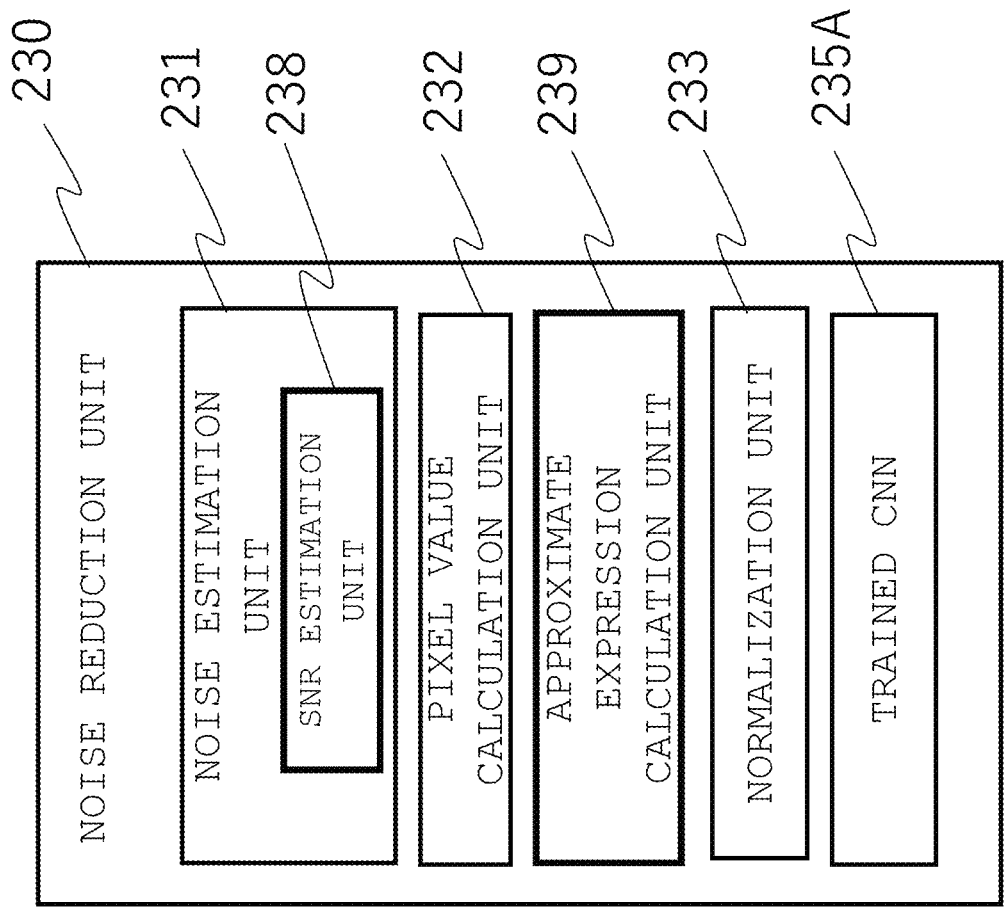
FIG. 14 is a functional block diagram of the noise reduction unit according to a third embodiment.

FIG. 14 shows a configuration example of the noise reduction unit 230 of the present embodiment. In FIG. 14, the same elements as those in FIG. 4 and FIG. 10 are denoted by the same reference numerals, and redundant description will not be given. As shown in FIG. 14, the noise reduction unit 230 of the present embodiment includes an SNR estimation unit 238 as one aspect of the noise estimation unit 231, and the normalization unit 233 includes an approximate expression calculation unit 239 that calculates an approximate expression of the normalization coefficient. Though not illustrated, similar to the other embodiments, the CNN learning unit 250 has a function corresponding to the noise reduction unit 230, and the CNN learning unit 250 may be provided in any of the computer 20 and the other computer 20A.

Figure 16:
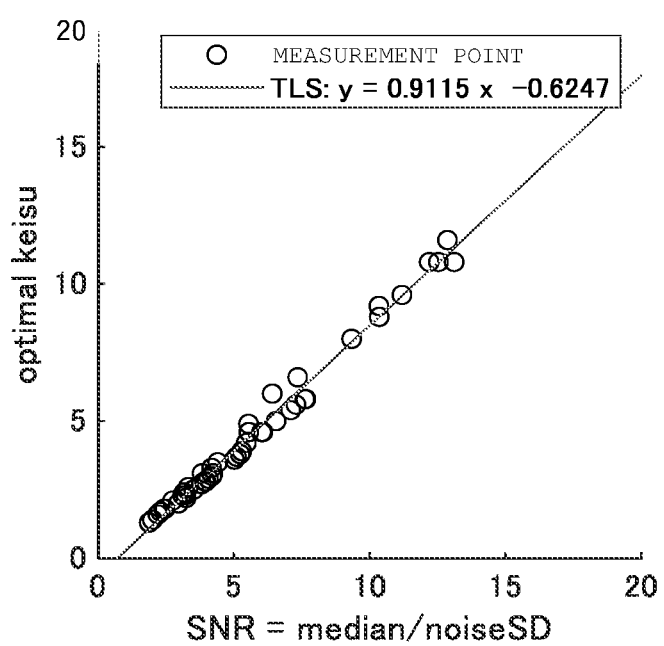
FIG. 16 illustrates the relation between an SNR (signal-to-noise ratio) and a normalization coefficient according to the third embodiment.

With reference to FIGS. 15 to 17, there will now be described the noise reduction process of the present embodiment including the processing details of each unit.

First, the processing steps of the CNN learning unit 250 will be described. As illustrated in FIG. 15, the CNN learning unit 250 prepares an image with little noise (correct image) and a noise image obtained by adding noise to the correct image (S61). Next, there is obtained the median value of the region (non-zero region) in which the pixel values of the correct image are non-zero, and the correct image and the noise image are entirely divided by the obtained median value. Then, both images are normalized (S62). The median value may be not the median value of the correct image, but the median value of the noise image (the non-zero region of the noise image). CNN learning is performed using the pairs of the normalized correct image and noise image, and the trained CNN 235A is obtained (S63).

Next, the approximate expression calculation unit 239 calculates the approximate expression of the normalization coefficient. For this purpose, as in the above-described processing steps S61 and S62, the correct image and the noise image are generated (S71), and the entire noise image is divided by the median value $M_{noise}$ of the non-zero region of the noise image, so as to normalize the noise image (S72).

Next, the normalized noise image is multiplied by multiple number (N) of coefficients K ($K_1$ to $K_N$) to obtain multiple noise images (N images), and then noise reduction of the noise images is performed using the CNN 235A trained in S63 (S73). Each of the noise-reduced images is multiplied by "the median value $M_{noise}$ of the noise image"/"the coefficient by which the noise image was multiplied" and returned to the original values. Then, the root mean square error (RMSE) is calculated with respect to the correct image, and a coefficient (optimal factor) $K_{opt}$ that minimizes the RMSE is obtained (S74). After multiplying the original noise image by the optimal factor $K_{opt}$, the background noise N" of the noise image before the noise reduction is estimated (S75). The SNR estimation unit 238 obtains the median value $M'_{noise}$ of the non-zero region of the noise image after multiplied by the optimal factor $K_{opt}$, and calculates the SNR of this noise image as $M'_{noise}/N"$ (S76).

With varying the noise intensity of the noise image generated in S71, the processing steps S71 to S76 are repeated (S77), and a combination of the optimal factor $K_{opt}$ and the SNR is calculated for each of the noise images having different noise intensity (S78). FIG. 16 shows the relation between the SNR and the optimal factor (keisu) $K_{opt}$ obtained by the above-described repetition. As shown, the relation between the two can be approximated, for example, by the following linear expression:

$$Ki = a \cdot SNR + b \quad (1)$$

The approximate expression calculation unit 239 approximately obtains the linear regression slope a and the linear regression intercept b of the approximate expression, from the relation between the $K_{opt}$ and the SNR obtained for each of the noise images having different noise intensity. However, the approximate expression is not limited to the linear expression.

The creation of the trained CNN and the calculation of the approximate expression representing the relation between the normalization coefficient and the noise, are completed by the processing steps described so far. The noise reduction unit 230 uses the trained CNN and the approximate expression to perform normalization of the input image and the noise reduction process thereon. With reference to FIG. 17, there will now be described the noise reduction process.

First, with respect to the input image, the noise estimation unit 231 (background noise estimation unit 2311) obtains the background noise N (S81) in the same manner as in the first embodiment. Then, the pixel value calculation unit 232 calculates the median value $M_{input}$ of the non-zero region of the input image. The SNR estimation unit 238 calculates $M_{input}/N$ to be set as the SNR of the input image (S82).

The normalization unit 233 substitutes this SNR into the approximate expression calculated by the approximate expression calculation unit 239 to obtain the optimal factor $K_{opt}$ (S83).

$$K_{opt} = a \cdot (SNR/f) + b \quad (2)$$

where f is an adjustment factor for determining the denoising intensity and this adjustment factor has the same meaning as the adjustment factor F described in the second embodiment. That is, the value of f is made larger to increase the denoising intensity, whereas the value of f is made smaller to decrease the denoising intensity. In the second embodiment, there has been described the case where a discrete value is taken as F. In the present embodiment, however, since the normalization coefficient is a function with SNR, it is possible to take an intermediate value as the adjustment factor f. The value of f may be fixed to 1, which is a moderate denoising intensity, or may be adjusted as appropriate, for example, to a value between 0.5 and 2.0, as specified by the user, for instance. When f=1, Equation 2 becomes Equation 1 as described above.

The normalization unit 233 divides the input image by the median value $M_{input}$ thereof, and then multiplied by the optimal factor $K_{opt}$ obtained as described above (Equation 3 as the following). Then, this normalizes the input image (S84).

$$I_n = (1/M_{input}(I_0)) \cdot K_{opt} \cdot I_0 \quad (3)$$
$$= (1/M_{input}(I_0)) \cdot (a \cdot (SNR/f) + b) \cdot I_0$$

where $I_0$ is the input image prior to normalization and $I_n$ is the input image being normalized.

The input image normalized in this way is inputted into the trained CNN to obtain the noise-reduced output image (S85).

According to the present embodiment, the relation between the index SNR indicating the noise and the optimal normalization coefficient is obtained approximately. Then, in applying the CNN that has been trained using the training images normalized based on the noise, the input image is normalized based on the estimated SNR of the input image, using the optimal normalization coefficient obtained from the relation between the SNR obtained approximately and the optimal normalization coefficient, whereby noise reduction can be achieved in association with various input images having different noise levels and signal levels. Further, according to the present embodiment, by using the relational expression between the SNR and the normalization coefficient, only a single trained CNN is sufficient and the noise reduction with high accuracy can be achieved as well.

Further, according to the present embodiment, the denoising intensity can be adjusted in the relational expression, and the user's degree of freedom in adjusting the denoising intensity is improved.

There have been described the embodiments of the present invention, taking as an example the processing within the MRI apparatus. However, the present invention is not limited to the MRI apparatus. The present invention can be implemented in devices (such as an image processor, a computer, and a workstation) capable of executing general image processing programs. Further, in the embodiments, there has been described the noise reduction process of an MR image using the property of MR image, that is, the background noise is proportional to the noise of the entire image. The present invention is, however, based on the idea that in the noise reduction process of the image using a CNN, normalization is optimized so that the pixel values of the input image fall within the pixel value range of the normalized images used in the CNN. In particular, the normalization reflecting the noise information of the image is performed, and as long as the noise information can be estimated from the image, the noise reduction process can be applied to any image without limited to MR images. Further, available noise information and methods of reflecting such noise information in the normalization are not limited to the methods of the described embodiments.

What is claimed is:

1. A magnetic resonance imaging apparatus comprising:
   a measurement unit configured to measure nuclear magnetic resonance signals generated from a subject; and a calculation unit configured to generate a normalized image using the nuclear magnetic resonance signals,
wherein the calculation unit includes
a noise reduction unit configured to reduce noise of an input image using a CNN (convolutional neural network) to produce a noise-reduced image, where the CNN has been trained with pairs of normalized noise images and corresponding normalized correct images, each pair being a pair of an image having noise as a normalized noise image and an image having no noise or less noise than the normalized noise images as a normalized correct image,
a normalization unit configured to normalize the input image with a normalization factor and to perform a noise reduction process using the CNN on the input image being normalized,
an SNR estimation unit configured to estimate an SNR (signal-to-noise ratio) of the input image, and
an approximate expression calculation unit configured to calculate an approximate relation between SNRs of noise images and corresponding optimal normalization factors in the form of an approximate expression, by repeatedly minimizing, for pairs of noise training images with varying SNRs and respective correct training images, the difference between the noise-reduced image produced by the noise reduction unit from the respective noise training image and respective correct training image over a set of different normalization factors used in the normalization unit, and
wherein the normalization unit is configured to determine an optimal normalization factor for the input image from the calculated approximate relation based on the SNR of the input image estimated by the SNR estimation unit, and to normalize the input image with the thus-determined optimal normalization factor.

2. The magnetic resonance imaging apparatus according to claim 1, wherein the normalization unit comprises a pixel value calculation unit configured to calculate pixel values of a subject region in the input image, and the pixel values are used as signal level information.

3. The magnetic resonance imaging apparatus according to claim 2, wherein
the noise reduction unit comprises a background noise estimation unit configured to estimate a magnitude of background noise from the input image, and
the pixel value calculation unit calculates the pixel values of the subject region, using the pixel value larger than the magnitude of the background noise estimated by the background noise estimation unit.

4. The magnetic resonance imaging apparatus according to claim 3, wherein the noise reduction unit comprises a noise level calculation unit configured to calculate a noise level of the input image, using as noise information, the magnitude of the background noise and the pixel values of the subject region, and to use the CNN trained with the noise image having a noise level equal to or close to the noise level calculated by the noise level calculation unit.

5. The magnetic resonance imaging apparatus according to claim 1, wherein the noise reduction unit has multiple CNNs trained with variously changed noise magnitude, and in response to noise information of the input image, selects any of the multiple CNNs to perform the noise reduction process.

6. The magnetic resonance imaging apparatus according to claim 5, further comprising:
an input unit configured to accept a user specification regarding denoising intensity, wherein the noise reduction unit selects one or more CNNs from the multiple CNNs according to the user specification accepted by the input unit.

7. The magnetic resonance imaging apparatus according to claim 1, wherein
the noise reduction unit comprises a noise estimation unit configured to estimate noise information of the input image, and the normalization unit uses as the normalization factor, the noise information estimated by the noise estimation unit.

8. The magnetic resonance imaging apparatus according to claim 7, wherein
the noise reduction unit further comprises a target noise calculation unit configured to calculate a target noise, using a relation between the normalization factor having multiple different values obtained in advance from multiple noise images having different noise magnitude, and background noise of the image normalized with the normalization factor, and
the normalization unit normalizes the input image using the target noise as the normalization factor.

9. The magnetic resonance imaging apparatus according to claim 8, wherein the normalization factor further includes an adjustment factor for adjusting denoising intensity.

10. The magnetic resonance imaging apparatus according to claim 1, wherein the approximate expression calculation unit multiplies the SNR in the approximate expression by an adjustment factor for adjusting denoising intensity to obtain the approximate expression.

11. The magnetic resonance imaging apparatus according to claim 1, wherein
training images used in the CNN include a combination of a correct image of high SNR with less noise and a noise image obtained by adding noise to the correct image of high SNR, or a combination of the correct image of low SNR obtained by adding noise to the correct image of high SNR with less noise and the noise image obtained by adding noise to the correct image of low SNR, and the noise image and the correct image are normalized using estimated pixel values of a subject region.

12. The magnetic resonance imaging apparatus according to claim 11, wherein the estimated pixel values of the subject region are values obtained by estimating noise magnitude from the noise image to obtain a mean value of the pixel values which are larger than the noise magnitude being estimated.

13. A noise reduction method that uses a CNN (convolutional neural network) that has been trained with pairs of normalized noise images and corresponding normalized correct images having no noise or less noise than the normalized noise images, so as to reduce noise in an input image of the CNN, the noise reduction method comprising:
normalizing the input image with a normalization factor;
performing a noise reduction process using the CNN on the input image being normalized;
estimating an SNR (signal-to-noise ratio) of the input image;
based on the estimated SNR of the input image, obtaining an optimal normalization factor in advance using multiple noise training images with different SNRs and minimizing a difference between the noise training images and respective correct training image
calculating an approximate relation between SNRs of noise images and corresponding optimal normalization factors in the form of an approximate expression, by repeatedly minimizing, for pairs of noise training images with varying SNRs and respective correct training images, the difference between the noise-reduced image produced from the respective noise training image and respective correct training image over a set of different normalization factors; and determining the normalization factor for the input image, using the approximate relation, in the form of an approximate expression, between the optimal normalization factor and the SNR of noise images, the input image being normalized with the thus determined normalization factor.

14. The noise reduction method according to claim 13, wherein the input image is an image acquired by a magnetic resonance imaging apparatus.

15. The noise reduction method according to claim 13, further comprising:

extracting a region of pixel values larger than a threshold that is higher than 1, from an image obtained by dividing the input image by noise magnitude, and obtaining a mean value of the pixel values of the region thus extracted, and dividing by the mean value, the image divided by the noise magnitude to obtain the input image of the CNN.

16. The noise reduction method according to claim 13, further comprising:

obtaining with respect to multiple noise images having different noise magnitude, a relation between multiple normalization factors having different values, and background noise of the images being normalized with the normalization factors, and setting a target noise based on the relation between the normalization factors and the background noise, wherein the input image is normalized using the target noise as the normalization factor.

17. The noise reduction method according to claim 13, further comprising:

obtaining with respect to multiple noise images having different SNRs, a relation between an optimal normalization factor and the SNRs of the noise images, the optimal normalization factor minimizing a difference between the multiple noise images and the correct image, and estimating the SNR of the input image, wherein using the relation between the optimal normalization factor and the SNRs of the noise images, and the SNR of the input image, the normalization factor of the input image is determined, and the input image is normalized with thus determined normalization factor.

18. An image processor having a CNN (convolutional neural network) trained with a normalized noise image and a normalized correct image having less noise than the noise image, the image processor comprising:

a noise reduction unit configured to reduce noise of an input image using the CNN to produce a noise-reduced image, where the CNN has been trained with pairs of normalized noise images and corresponding normalized correct images, each pair being a pair of an image having noise as a normalized noise image and an image having no noise or less noise than the normalized noise image as a normalized correct image;

a normalization unit configured to normalize the input image with a normalization factor and to perform a noise reduction process using the CNN on the input image being normalized;

an SNR estimation unit configured to estimate an SNR (signal-to-noise ratio) of the input image; and an approximate expression calculation unit configured to calculate a relation between SNRs of noise images and corresponding optimal normalization factors in the form of an approximate expression by repeatedly minimizing, for pairs of noise training images with varying SNRs and respective correct training images, the difference between a noise-reduced image produced by the noise reduction unit from the respective noise training image and the respective correct training image over a set of different normalization factors used in the normalization unit, wherein the normalization unit is configured to determine the optimal normalization factor for the input image from the calculated approximate relation based on the SNR of the input image estimated by the SNR estimation unit, and to normalize the input image with the thus determined optimal normalization factor.

* * * * *